United States Patent
Takakura et al.

(10) Patent No.: US 11,990,739 B2
(45) Date of Patent: May 21, 2024

(54) WIRING MEMBER WITH FIXING MEMBER AND FIXING STRUCTURE OF WIRING MEMBER

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Ryuta Takakura, Mie (JP); Miyu Aramaki, Mie (JP); Daisuke Ebata, Mie (JP); Taku Umehara, Mie (JP); Tetsuya Nishimura, Mie (JP); Kenta Arai, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 338 days.

(21) Appl. No.: 17/435,219

(22) PCT Filed: Mar. 6, 2019

(86) PCT No.: PCT/JP2019/008755
§ 371 (c)(1),
(2) Date: Aug. 31, 2021

(87) PCT Pub. No.: WO2020/178998
PCT Pub. Date: Sep. 10, 2020

(65) Prior Publication Data
US 2022/0140587 A1    May 5, 2022

(51) Int. Cl.
*H02G 3/32* (2006.01)
*B60R 16/02* (2006.01)
*H01B 7/40* (2006.01)

(52) U.S. Cl.
CPC .......... *H02G 3/32* (2013.01); *B60R 16/0215* (2013.01); *H01B 7/40* (2013.01)

(58) Field of Classification Search
CPC ........ H02G 3/32; H02G 3/30; B60R 16/0215; H01B 7/40; F16B 5/12; F16B 19/10; F16B 19/1081
(Continued)

(56) References Cited

U.S. PATENT DOCUMENTS 4,811,922 A * 3/1989 Yoneyama ............... H02G 3/26
                                                        248/548
5,339,491 A * 8/1994 Sims .................. B60R 16/0215
                                                         16/2.2
(Continued)

FOREIGN PATENT DOCUMENTS

JP    06-181006    6/1994
JP    2002-10452   1/2002
(Continued)

OTHER PUBLICATIONS

International Search Report issued in International Pat. Appl. No. PCT/JP2019/008755, dated May 21, 2019, along with an English translation thereof.
(Continued)

*Primary Examiner* — Muhammad Ijaz
(74) *Attorney, Agent, or Firm* — Greenblum & Bernstein, P.L.C.

(57) ABSTRACT

A wiring member with a fixing member includes a flat wiring member, and a fixing member. The fixing member includes an attachment part and a fixing part. The attachment part includes an annular part and an annular shape maintaining part. The annular part is capable of changing a state between an annular state and a non-annular state. The annular shape maintaining part is provided at one end
(Continued)

portion of the annular part, fastens another end portion of the annular part, and maintains the annular part in the annular state. In a state in which the annular part is in the annular state and the attachment part is attached to the flat wiring member, a part of the flat wiring member to which the attachment part is attached is in a spread state.

8 Claims, 8 Drawing Sheets

(58) Field of Classification Search
USPC .................................................. 248/68.1, 65
See application file for complete search history.

(56) References Cited

U.S. PATENT DOCUMENTS

| | | | |
|---|---|---|---|
| 10,766,438 | B2 | 9/2020 | Mizuno et al. |
| 10,867,721 | B2 | 12/2020 | Ishida et al. |
| 2001/0054671 | A1 | 12/2001 | Kondo |
| 2005/0123372 | A1* | 6/2005 | Sato .................. F16B 5/0258 411/32 |
| 2007/0290100 | A1* | 12/2007 | Caveney ............. H02G 3/0437 248/74.3 |
| 2020/0141518 | A1 | 5/2020 | Nakano et al. |
| 2020/0353880 | A1 | 11/2020 | Mizuno et al. |

FOREIGN PATENT DOCUMENTS

| | | |
|---|---|---|
| JP | 2006-34043 | 2/2006 |
| JP | 2010-283945 | 12/2010 |
| JP | 2011-149456 | 8/2011 |
| JP | 2015-53804 | 3/2015 |
| JP | 2017-017793 | 1/2017 |
| JP | 2018-137168 | 8/2018 |
| JP | 2018-137208 | 8/2018 |
| JP | 2019-004679 | 1/2019 |

OTHER PUBLICATIONS

Office Action issued in Corresponding JP Patent Application No. 2019-162187, dated Dec. 13, 2022, along with an English translation thereof.

Office Action issued in Corresponding JP Patent Application No. 2019-162187, dated Jul. 18, 2023 along with an English translation thereof.

* cited by examiner

WIRING MEMBER WITH FIXING MEMBER AND FIXING STRUCTURE OF WIRING MEMBER

TECHNICAL FIELD

The present disclosure relates to a wiring member with a fixing member and a fixing structure of the wiring member.

BACKGROUND ART

Patent Document 1 discloses a wire harness. The wire harness includes a functional exterior member formed into a sheet-like shape, and an electric wire disposed to overlap the functional exterior member in at least a part of a region along a longitudinal direction. At least a portion of a part in which an insulation covering of the electric wire and the functional exterior member overlap is welded.

Patent Document 2 discloses a band clamp that is attached to a wire harness and that fixes the wire harness to a vehicle.

PRIOR ART DOCUMENTS

Patent Documents

Patent Document 1: Japanese Patent Application Laid-Open No. 2018-137208
Patent Document 2: Japanese Patent Application Laid-Open No. 2011-149456

SUMMARY

Problem to be Solved by the Invention

It is desirable that, in a state in which the wire harness described in Patent Document 1 is fixed to a fixing target by a fixing member including an annular part such as the band clamp described in Patent Document 2, the wire harness be able to maintain its spread state to the extent possible.

In view of this, an object is to provide a technology that enables a flat wiring member to maintain its spread state to the extent possible in a state of being fixed to a fixing target by a fixing member including an annular part.

Means to Solve the Problem

A wiring member with a fixing member according to the present disclosure is a wiring member with a fixing member that includes a flat wiring member, and a fixing member. The flat wiring member includes a plurality of wire-like transmission members and a base material. The plurality of wire-like transmission members are fixed to the base material in an arrayed state. The fixing member includes an attachment part and a fixing part. The attachment part includes an annular part and an annular shape maintaining part. The annular part is capable of changing a state between an annular state and a non-annular state. The annular shape maintaining part is provided at one end portion of the annular part, fastens another end portion of the annular part, and maintains the annular part in the annular state. The fixing part is a part being connected to the attachment part and being fixed to a fixing target of the flat wiring member. In a state in which the annular part is in the annular state and the attachment part is attached to the flat wiring member, a part of the flat wiring member to which the attachment part is attached is in a spread state.

Effects of the Invention

According to the present disclosure, the flat wiring member can maintain its spread state to the extent possible in a state of being fixed to a fixing target by a fixing member including an annular part.

DESCRIPTION OF EMBODIMENTS

Description of Embodiments of Present Disclosure

First, embodiments of the present disclosure will be listed below.

A wiring member with a fixing member according to the present disclosure is as follows.

(1) A wiring member with a fixing member includes a flat wiring member, and a fixing member. The flat wiring member includes a plurality of wire-like transmission members and a base material. The plurality of wire-like transmission members are fixed to the base material in an arrayed state. The fixing member includes an attachment part and a fixing part. The attachment part includes an annular part and an annular shape maintaining part. The annular part is capable of changing a state between an annular state and a non-annular state. The annular shape maintaining part is provided at one end portion of the annular part, fastens another end portion of the annular part, and maintains the annular part in the annular state. The fixing part is a part being connected to the attachment part and being fixed to a fixing target of the flat wiring member. In a state in which the annular part is in the annular state and the attachment part is attached to the flat wiring member, a part of the flat wiring member to which the attachment part is attached is in a spread state.

In a state in which the attachment part is attached to the flat wiring member, the annular part is in the annular state under a state in which a part of the flat wiring member to which the attachment part is attached is spread, and thus the flat wiring member can maintain a flat state to the extent possible in a state in which the fixing member including the annular part is attached to the flat wiring member. When the fixing part is fixed to the fixing target in this state, the flat wiring member can maintain the spread state to the extent possible in the state of being fixed to the fixing target by the fixing member including the annular part.

Here, the wire-like transmission member is a wire-like member that transmits electrical power, light, or the like.

(2) The annular part may be a band capable of being entirely bent and deformed. In the annular state in which the band surrounds at least a part of the flat wiring member, the attachment part may be attached to the flat wiring member. In this case, the fixing member being a member separate from the flat wiring member can be used.

(3) The annular part may be a band being formed to be capable of being entirely bent and deformed and partially joined to the base material. In this case, the fixing member can be directly fixed to the base material.

(4) A main surface of the base material on an opposite side of a main surface to which the wire-like transmission members are fixed may be joined to an outer circumferential portion of the band. In this case, the flat wiring member is located outside of the band, and thus the spread state can be easily maintained.

(5) The annular part may surround both of the base material and the plurality of wire-like transmission members, and surround the flat wiring member entirely in a width direction. This mode is, for example, effective when the width dimension of the flat wiring member is small.

(6) The annular part may surround both of the base material and the plurality of wire-like transmission members, and surround the flat wiring member only partially in a width direction. This mode is, for example, effective when the width dimension of the flat wiring member is large.

(7) The annular part may be inserted between the base material and the plurality of wire-like transmission members, and surround only the base material among the base material and the plurality of wire-like transmission members. In this case, the annular part is not required to surround the wire-like transmission members.

(8) The annular part may be inserted between the base material and the plurality of wire-like transmission members, and surround only the plurality of wire-like transmission members among the base material and the plurality of wire-like transmission members. In this case, the base material is located outside of the wire-like transmission members, and thus the wire-like transmission members are less liable to come in contact with a surrounding member.

(9) At least a part of a part surrounded by the annular part in the flat wiring member may be spread along a plane surface part provided in the fixing member and come in contact with the plane surface part. In this case, a part of the flat wiring member to come in surface contact with the plane surface part can be easily maintained in a flat state.

(10) Further, a fixing structure of a wiring member according to the present disclosure is a fixing structure of a wiring member that includes a flat wiring member, a fixing target, and a fixing member. The flat wiring member includes a plurality of wire-like transmission members and a base material. The plurality of wire-like transmission members are fixed to the base material in an arrayed state. The fixing member includes an annular part and an annular shape maintaining part. A part of the annular part is joined to the base material. The annular part is capable of changing a state between an annular state and a non-annular state, and surrounds only the fixing target among the fixing target and the flat wiring member in the annular state. The annular shape maintaining part is provided at one end portion of the annular part, fastens another end portion of the annular part, and maintains the annular part in the annular state. The annular part is partially joined to the base material, and surrounds only the fixing target among the fixing target and the flat wiring member in the annular state, and thus the flat wiring member can maintain the spread state to the extent possible in a state of being fixed to the fixing target by the fixing member including the annular part.

(11) Further, a fixing structure of a wiring member according to the present disclosure is a fixing structure of a wiring member that includes a flat wiring member, a fixing target, and a fixing member. The flat wiring member includes a plurality of wire-like transmission members and a base material. The plurality of wire-like transmission members are fixed to the base material in an arrayed state. The fixing member includes an annular part and an annular shape maintaining part. The annular part is capable of changing a state between an annular state and a non-annular state, and in the annular state, surrounds the fixing target and the flat wiring member, and presses the flat wiring member toward the fixing target. The annular shape maintaining part is provided at one end portion of the annular part, fastens another end portion of the annular part, and maintains the annular part in the annular state. The annular part in the annular state surrounds the fixing target and the flat wiring member, and presses the flat wiring member toward the fixing target, and thus the flat wiring member can maintain the spread state to the extent possible in state of being fixed to the fixing target by the fixing member including the annular part.

Details of Embodiments of Present Disclosure

Specific examples of a wiring member with a fixing member according to the present disclosure will be described below with reference to the drawings. Note that the present invention is not limited to these examples but is recited in the claims, and encompasses meanings equivalent to those of the claims and all modifications within the scope of the claims.

First Embodiment

Figure 1:
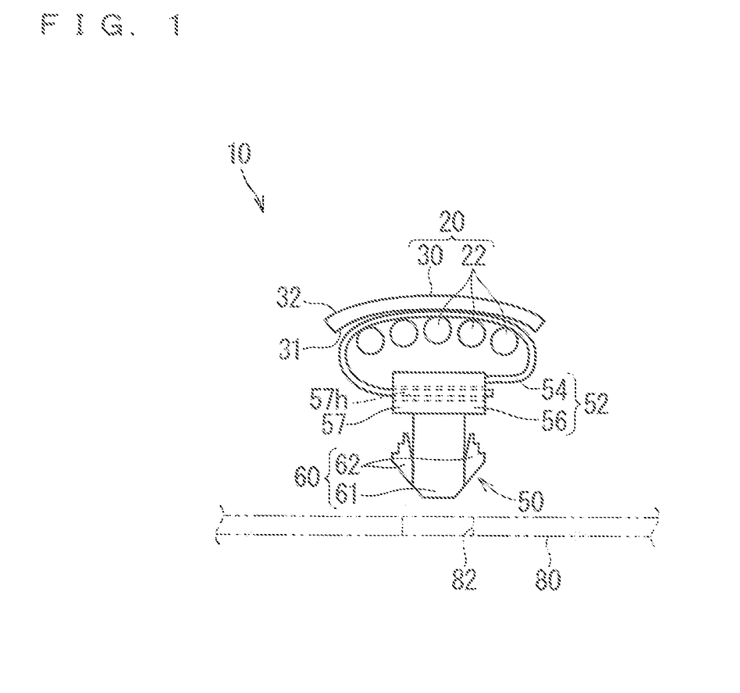
FIG. 1 is a front view illustrating a wiring member with a fixing member according to the first embodiment.
Figure 2:
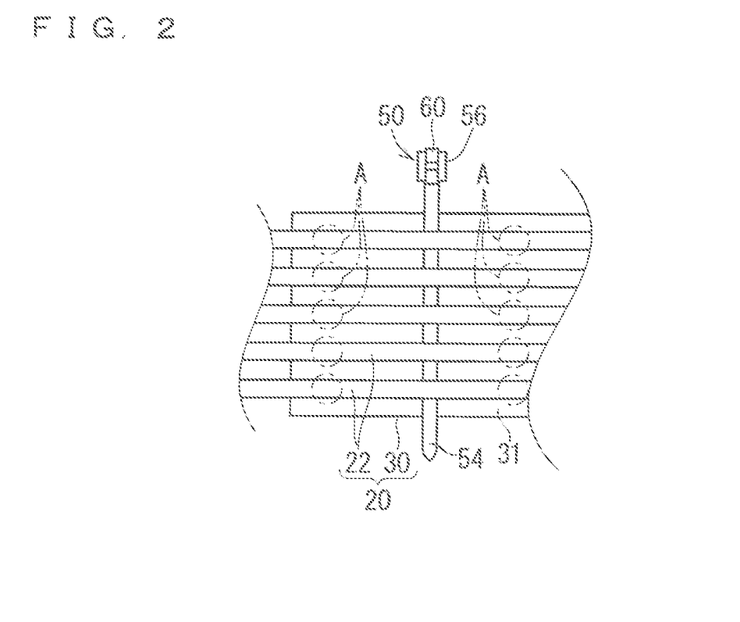
FIG. 2 is an explanatory diagram illustrating a state before an annular part enters an annular state.

A wiring member with a fixing member according to the first embodiment will be described below. FIG. 1 is a front view illustrating a wiring member with a fixing member 10 according to the first embodiment. FIG. 2 is an explanatory diagram illustrating a state before an annular part 54 enters an annular state.

The wiring member with a fixing member 10 includes a flat wiring member 20 and a fixing member 50.

The flat wiring member 20 is a member that is mounted on a vehicle, and that supplies electrical power to each device of the vehicle and transmits and receives signals. The flat wiring member 20 has its dimension in the thickness direction being formed smaller than the dimension in a direction perpendicular to the thickness direction. The flat wiring member 20 includes a plurality of wire-like transmission members 22, and a base material 30 that is fixed in a state in which the plurality of wire-like transmission members 22 are arrayed.

It is only necessary that the wire-like transmission member 22 is a wire-like member that transmits electrical power or light. For example, the wire-like transmission member 22 may be a general wire having a core wire and a covering around the core wire, or may also be a bare conductive wire, a shielded wire, an enamel wire, a nichrome wire, or an optical fiber.

The wire-like transmission member 22 transmitting the electrical power may be various kinds of signal lines or various kinds of power lines. The wire-like transmission member 22 transmitting the electrical power may be used as an antenna or coil, for example, transmitting or receiving a signal or electrical power to or from a space.

The wire-like transmission member 22 includes a transmission wire body that transmits electrical power, light, or the like, and a covering that covers the transmission wire body. When the wire-like transmission member 22 is a general wire, the transmission wire body is a core wire, and the covering is an insulation covering. In the example illustrated in FIG. 2, a plurality of wire-like transmission members 22 having the same diameter and structure are disposed on one base material 30. However, it is only necessary that the diameter, structure, or the like of the plurality of wire-like transmission members 22 be set as appropriate, and the wire-like transmission members 22 having different diameters, structures, or the like may be disposed on the same base material 30.

The wire-like transmission member 22 may be a single wire-like material, or may be a composite of a plurality of wire-like materials (twist wire, a cable in which a plurality of wire-like materials are collected and then covered by a sheath, or the like). At an end portion of the wire-like transmission member 22, a terminal, a connector, or the like is provided as appropriate, according to a mode of connecting with a member to be connected with the wire-like transmission member 22.

The base material 30 holds the plurality of wire-like transmission members 22 in an arrayed state. Here, the base material 30 is a sheet-like member that is formed separately from the wire-like transmission members 22. The wire-like transmission members 22 are disposed along a predetermined route on a main surface of the base material 30 being formed into a sheet-like shape. In the following, in the base material 30, one main surface to which the wire-like transmission members 22 are fixed is referred to as a main surface 31, and another main surface on the opposite side of the main surface 31 is referred to as a main surface 32. It can also be interpreted that the wire-like transmission members 22 are held in a state that is two-dimensionally positioned on the base material 30.

Although the material constituting the base material 30 is not particularly limited, the base material 30 is, for example, made of a material containing resin such as polyvinyl chloride (PVC), polyethylene terephthalate (PET), and polypropylene (PP). The base material 30 may be, for example, a fiber material including fibers, such as nonwoven fabrics, a cloth, and knitted fabrics, or may be a non-fiber material. The non-fiber material may include a solid member whose inside is uniformly filled, a foamed material that is made of resin being foamed, or the like. The base material 30 may include a material such as metal.

The base material 30 may be a single layer, or may have a plurality of layers being stacked. When a plurality of layers are stacked, for example, it is considered that a resin layer and another resin layer are stacked. Alternatively, for example, it is considered that a resin layer and a metal layer are stacked. Further, the base material 30 may be a material in which a non-fiber material layer and another non-fiber material layer are placed on one another, may be a material in which a non-fiber material layer and a fiber material layer are placed on one another, or may be a material in which a fiber material layer and another fiber material layer are placed on one another.

The base material 30 may be a bendable member, may be a member having such rigidity as to allow the base material 30 to curve and hold the plurality of wire-like transmission members 22 in a state of being planarly positioned, or may be a member having such rigidity as to allow the base material 30 to hold the plurality of wire-like transmission members 22 in a state of being two-dimensionally positioned in a state of maintaining its flat state. The base material 30 may include a part having a three-dimensional shape, such as a partially formed upright wall.

The base material 30 is formed into a band-like shape that extends along the route of the wire-like transmission members 22. It is only necessary that the route of the wire-like transmission members 22 on the base material 30 be set as appropriate, and in the example illustrated in FIG. 1, the wire-like transmission members 22 have a part that is linearly disposed on the base material 30. A fixing member 50 is attached to the part where the wire-like transmission member 22 is linearly disposed.

The wire-like transmission members 22 may include a part being bent and disposed on the base material 30. In this case, the base material 30 may also be formed to be bent along the main surface 31 in accordance with the bending of the wire-like transmission members 22. The plurality of wire-like transmission members 22 may be disposed in different routes, such as in a manner of branching or crossing on the base material 30. In this case, the base material 30 may also be formed so as to branch or cross. With the base material 30 being formed into a shape along the route of the plurality of wire-like transmission members 22, interference between the base material 30 and other components can be reduced, and weight can be reduced, for example.

The wire-like transmission members 22 and the base material 30 are fixed. As the fixing mode, contact area fixation may be used, non-contact area fixation may be used, or both of them may be used at the same time. Here, the contact area fixation is a mode in which the wire-like transmission members 22 and the base material 30 are fixed to each other with their contact part coming in contact with each other. Further, the non-contact area fixation is a fixing mode different from the contact area fixation. For example, the non-contact area fixation is a mode to maintain the wire-like transmission members 22 and the base material 30 in a state of being fixed to each other. This mode is obtained as follows, for example: a thread, another base material, an adhesive tape, or the like presses the wire-like transmission members 22 down toward the base material 30, or a thread, another base material, an adhesive tape, or the like surrounds the wire-like transmission members 22 and the base material 30, for example, so as to interpose the wire-like transmission members 22 and the base material 30. The following description will be given based on the assumption that the wire-like transmission members 22 and the base material 30 are in a state of the contact area fixation. Each description related to the contact area fixation can also be applied to the non-contact area fixation, unless the application is impossible.

As a mode of the contact area fixation, indirect fixation may be used, direct fixation may be used, or both of them may be used at the same time in different regions. Here, the indirect fixation is a mode in which the wire-like transmission members 22 and the base material 30 are fixed to each other by being indirectly coming in contact via an intermediation material being provided therebetween, such as an adhesive agent, a pressure sensitive adhesive, a double-sided adhesive tape, and a hook-and-loop fastener. Further, the direct fixation is a mode in which the wire-like transmission members 22 and the base material 30 are fixed to each other by being directly coming in contact without the use of a material being separately provided, such as an adhesive agent. In the direct fixation, for example, it is considered that the wire-like transmission members 22 and the base material 30 are fixed by coming in contact with resin included in at least one of those being melted. The following description will be given based on the assumption that the wire-like transmission members 22 and the base material 30 are in a state of the direct fixation. Each description related to the direct fixation can also be applied to the indirect fixation, unless the application is impossible.

In forming the state of such a direct fixation, the resin is considered to be melted by heat or a solvent, for example. That is to say, the state of the direct fixation may be the state of the direct fixation by the heat or the state of the direct fixation by the solvent. The direct fixation by the heat is preferable.

At this time, a means of forming the state of the direct fixation is not particularly limited, but various means including a known means such as welding, fusion, and melting joint can be used. For example, when the state of the direct fixation by the heat is formed by welding, various welding means such as ultrasonic welding, beating-pressurizing welding, hot air welding, and high frequency welding can be adopted. Further, when the state of the direct fixation is formed with these means, the wire-like transmission members 22 and the base material 30 are in the state of the direct fixation with those means. Specifically, for example, when the state of the direct fixation is formed with ultrasonic welding, the wire-like transmission members 22 and the base material 30 has the state of the direct fixation with ultrasonic welding. A part where the state of the direct fixation with heat is formed with welding (fixing part between the wire-like transmission members 22 and the base material 30) may be referred to as a welding part, and among this, a fixing part with ultrasonic welding may be referred to as an ultrasonic welding part, and fixing part with heating pressurizing welding may be referred to as a heating pressurizing welding part, for example.

In the case of the direct fixation, only the resin included in the covering of the wire-like transmission member 22 may be melted, or only the resin included in the base material 30 may be incited. The resin which has been melted in these cases is stuck on an outer surface of the resin on the other side, and a relatively clear interface may be formed in some cases. Further, in the case of the direct fixation, both the resin included in the covering of the wire-like transmission member 22 and the resin included in the base material 30 may be melted. In this case, there may be a case where both the resins are mixed and a clear interface is not formed. In particular, when the covering of the wire-like transmission members 22 and the base material 30 include compatible resin such as the same resin material, there may be a case where both the resins are mixed and a clear interface is not be formed.

As the base material 30 that is directly fixed to the wire-like transmission members 22, a material obtained by stacking a first sheet-like member and a second sheet-like member may be used. The first sheet-like member is suitable for the direct fixation with the wire-like transmission members 22 than the second sheet-like member. For example, the first sheet-like member is a material that is formed into a solid sheet-like shape by an isologous material of the covering of the wire-like transmission members 22. The first sheet-like member appears on the main surface 31 of the base material 30. The wire-like transmission members 22 are directly fixed to the first sheet-like member. The second sheet-like member is a member having protection performance higher than that of the first sheet-like member. For example, the second sheet-like member is nonwoven fabrics. The second sheet-like member appears on the main surface 32 of the base material 30. Although in the base material 30 according to the present example, a layer of a metal sheet-like member is not stacked, a layer of a metal sheet-like member may be stacked.

The two-dot-one-dash line illustrated in FIG. 2 indicates positions at which the wire-like transmission members 22 and the base material 30 are directly fixed. As illustrated in FIG. 2, the wire-like transmission members 22 and the base material 30 are directly fixed at a plurality of positions at intervals in the extending direction of the wire-like transmission members 22. In other words, partial direct fixation positions A between the wire-like transmission members 22, the base material, and 30 are intermittently provided along the extending direction of the wire-like transmission members 22.

The fixing member 50 includes an attachment part 52 that is used for attachment to the flat wiring member 20, and a fixing part 60 that is fixed to a fixing target 80 of the flat wiring member 20. The fixing member 50 according to the present example is a molded item obtained by integrally molding the attachment part 52 and the fixing part 60 with resin being used as a material. The attachment part 52 includes an annular part 54 an annular shape maintaining part 56. The annular part 54 can change its state between an annular state (see FIG. 1) and a non-annular state (see FIG. 2). The annular shape maintaining part 56 is provided at one end portion of the annular part 54. The annular shape maintaining part 56 fastens another end portion of the annular part 54, and maintains the annular part 54 in the annular state. In the present example, the annular part 54 surrounds at least a part of the flat wiring member 20 in the annular state, and the attachment part 52 is thereby in a state of being attached to the flat wiring member 20. In a state in which the attachment part 52 is attached to the flat wiring member 20, the annular part 54 is in the annular state under a state in which a part of the flat wiring member 20 to which the attachment part 52 is attached is in a spread state.

Specifically, in the present example, a band clamp 50 is used as the fixing member 50. In other words, the attachment part 52 includes a band 54 as the annular part 54, and a band fixing part 56 as the annular shape maintaining part 56. The band 54 is formed into a narrow band-like so as to be capable of being entirely bent and deformed. The band fixing part 56 includes, for example, a body part 57, and an engaging protrusion (not shown). In the body part 57, a band insertion hole 57h through which the band 54 can be inserted is formed. The engaging protrusion is formed so as to protrude from an inner circumferential surface of the band insertion hole 57h toward a space inside the band insertion hole 57h. A plurality of engaged parts (not shown) that can be selectively engaged with the engaging protrusion are formed in the band 54. In a state in which the band 54 is inserted into the band insertion hole 57h, when the engaging protrusion is engaged with the engaged part, the band 54 is fastened at the band fixing part 56.

Here, the band 54 is inserted between the wire-like transmission members 22 and the base material 30 at the position between a plurality of direct fixation positions A along the extending direction of the wire-like transmission members 22. The band 54 surrounds only the wire-like transmission members 22 among the base material 30 and the wire-like transmission members 22. In the present example, the band 54 and the base material 30 are not joined together even if the band 54 and the base material 30 come in contact with each other. Similarly, the band 54 and the wire-like transmission members 22 are not joined together either even if the band 54 and the wire-like transmission members 22 come in contact with each other. In a state in which an intermediate portion of the band 54 surrounds the wire-like transmission members 22, when a tip end portion of the band 54 is fixed to the band fixing part 56, the attachment part 52 is in a state of being attached to the wiring member 20. The attachment part 52 may or may not fasten the wire-like transmission members 22. When the attachment part 52 fastens the wire-like transmission members 22 excessively, fixing between the wire-like transmission members 22 and the base material 30 may be undone, or the wire-like transmission members 22 may be bundled. Thus, it is preferable that the attachment part 52 fasten the wire-like transmission members 22 to the extent that fixing between the wire-like transmission members 22 and the base material 30 does not come undone and the arrayed state of the wire-like transmission members 22 is maintained.

The band fixing part 56 is located at the position to face the plurality of wire-like transmission members 22. The direction in which the band 54 penetrates the band fixing part 56 is a direction along the direction in which the plurality of wire-like transmission members 22 are arrayed.

When the plurality of wire-like transmission members 22 are fastened by the attachment part 52, it is considered that the plurality of wire-like transmission members 22 are arrayed along the inner surface of the band 54 being curved. In this case, the base material 30 to which the plurality of wire-like transmission members 22 are fixed may also be curved in the direction in which the band 54 is curved on the outer surface side of the band 54 in accordance with the plurality of wire-like transmission members 22.

The fixing part 60 is provided so as to protrude from the outer surface in the band fixing part 56. The fixing part 60 fixes the flat wiring member 20 to the fixing target 80. The present example will be given based on the assumption that the fixing target 80 is a plate-like member 80, such as a panel. The fixing part 60 is formed so as to be capable of being engaged with a fixing hole 82 that is formed in the plate-like member 80. The fixing part 60 includes a pillar part 61 that is formed to protrude from the band fixing part 56, and a pair of engagement pieces 62 that is formed to protrude from a tip end portion of the pillar part 61 toward a lateral side and a base end side of the pillar part 61. On the base end side of the pair of engagement pieces 62, the pair of engagement pieces 62 is formed so that its interval gradually becomes wider toward its tip end side. Further, when the fixing part 60 is inserted into the fixing hole 82 and comes in contact with a circumferential edge portion of the fixing hole 82, the pair of engagement pieces 62 can be elastically deformed so that its interval is reduced by receiving a force from the circumferential edge portion of the fixing hole 82. After the tip end portion passes through the fixing hole 82, the pair of engagement pieces 62 is elastically restored, and is engaged with the circumferential edge portion of the fixing hole 82. With this, the fixing part 60 is in a state of being fixed to the fixing target 80.

It is only necessary that the shape of the fixing part 60 be formed into a shape according to the fixing target 80, and the shape is not limited to the shape described above. For example, when the fixing target includes a fixing piece formed into a plate-like shape, it is preferable that the fixing part be formed into a shape that allows the fixing piece to be inserted and engaged.

According to the wiring member with a fixing member 10, in a state in which the attachment part 52 is attached to the flat wiring member 20, the annular part 54 is in the annular state under a state in which a part of the flat wiring member 20 to which the attachment part 52 is attached is spread, and thus the flat wiring member 20 can maintain a flat state to the extent possible in a state in which the fixing member 50 including the annular part 54 is attached to the flat wiring member 20. When the fixing part 60 is fixed to the fixing target 80 in this state, the flat wiring member 20 can maintain the spread state to the extent possible in the state of being fixed to the fixing target 80 by the fixing member 50 including the annular part 54.

The annular part 54 is the band 54 that can be entirely bent and deformed, and if the attachment part 52 is attached to the flat wiring member 20 in the annular state in which the band 54 surrounds at least a part of the flat wiring member 20, the fixing member 50 being a member separate from the flat wiring member 20 can be used.

When the annular part 54 is inserted between the base material 30 and the wire-like transmission members 22 and surrounds only the wire-like transmission members 22 among the base material 30 and the wire-like transmission members 22, the base material 30 is located outside of the wire-like transmission members 22, and thus the wire-like transmission members 22 are less liable to come in contact with a surrounding member.

Second Embodiment

Figure 3:
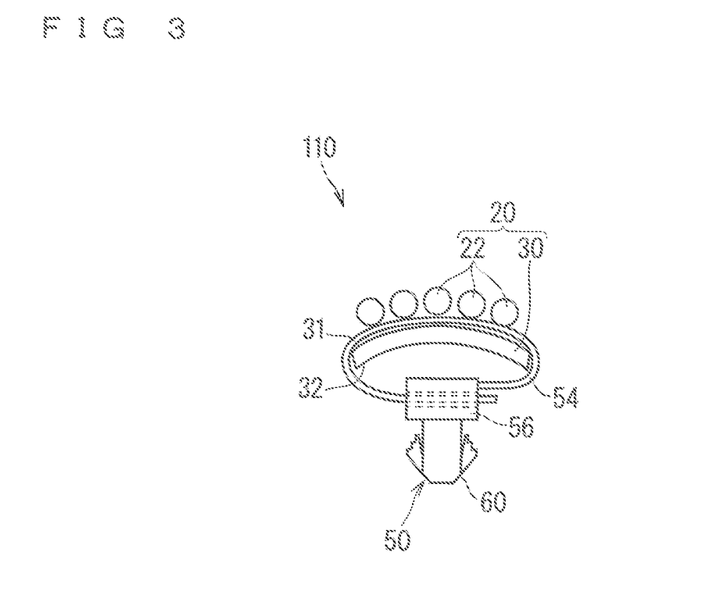
FIG. 3 is a front view illustrating a wiring member with a fixing member according to the second embodiment.

A wiring member with a fixing member according to the second embodiment will be described. FIG. 3 is a front view illustrating a wiring member with a fixing member 110 according to the second embodiment. Note that constituent elements similar to those described above in the description of the present embodiment are denoted by the same reference signs, and description thereof will be omitted. The same applies to description of each of the following embodiments.

In the present example, a member surrounded by the annular part 54 is different from the member surrounded by the annular part 54 in the first embodiment. Specifically, the annular part 54 surrounds only the base material 30 among the base material 30 and the wire-like transmission members 22. In this case, in the present example as well, the annular part 54 is inserted between the base material 30 and the wire-like transmission members 22. When the annular part 54 is inserted between the base material 30 and the wire-like transmission members 22 and surrounds only the base material 30 among the base material 30 and the wire-like transmission members 22 as in the present example, the annular part 54 is not required to surround the wire-like transmission members 22.

FIG. 3 illustrates an example in which the fixing member 50 is the band clamp 50. In the example illustrated in FIG. 3, the band fixing part 56 is located at the position to face the base material 30. The direction in which the band 54 penetrates the band fixing part 56 is the direction along the main surface 32 of the base material 30. Further, in the example illustrated in FIG. 3, the inner surface of the band 54 comes in surface contact with the main surface 31 of the base material 30.

Third Embodiment

Figure 4:
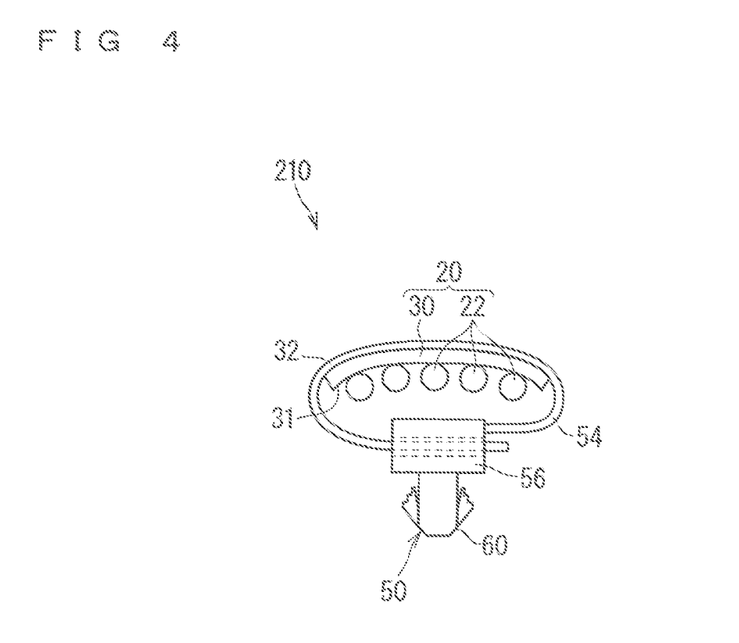
FIG. 4 is a front view illustrating a wiring member with a fixing member according to the third embodiment.
Figure 5:
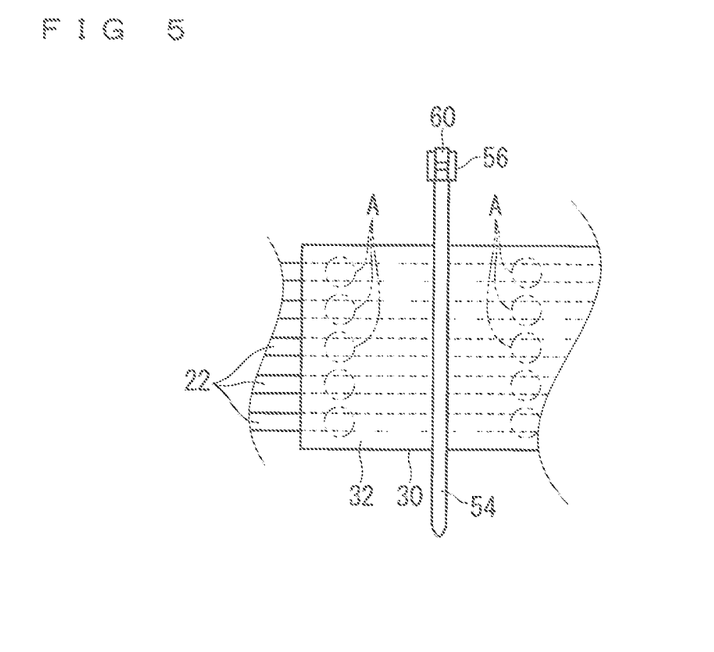
FIG. 5 is an explanatory diagram illustrating a state before the annular part enters the annular state.

A wiring member with a fixing member according to the third embodiment will be described. FIG. 4 is a front view illustrating a wiring member with a fixing member 210 according to the third embodiment. FIG. 5 is an explanatory diagram illustrating a state before the annular part 54 enters the annular state.

In the present example, a member surrounded by the annular part 54 is different from the member surrounded by the annular part 54 in the first and second embodiments. Specifically, the annular part 54 surrounds both of the base material 30 and the wire-like transmission members 22. In this case, the annular part 54 surrounds the flat wiring member 20 entirely in the width direction. When the annular part 54 surrounds both of the base material 30 and the wire-like transmission members 22, the annular part 54 is located outside of the base material 30 and the wire-like transmission members 22. The mode in which the annular part 54 surrounds both of the base material 30 and the wire-like transmission members 22 and also surrounds the flat wiring member 20 entirely in the width direction is, for example, effective when the width dimension of the flat wiring member 20 is small.

FIG. 4 illustrates an example in which the fixing member 50 is the band clamp 50. The band fixing part 56 is located at the position to face the wire-like transmission members 22. The direction in which the band 54 penetrates the band fixing part 56 is a direction along the direction in which the plurality of wire-like transmission members 22 are arrayed. Further, in the example illustrated in FIG. 4, the inner surface of the band 54 comes in surface contact with the main surface 32 of the base material 30.

In the present example, a part of the band 54 may be joined to the base material 30. As illustrated in FIG. 5, it is preferable that the intermediate portion of the band 54 be joined to the base material 30. The joining mode between the band 54 and the base material 30 is not particularly limited, and may be, for example, the direct fixation, the indirect fixation, or the like described above. When the band 54 and the base material 30 are directly fixed and the direct fixation positions between the wire-like transmission members 22 and the base material 30 are intermittently provided along the extending direction of the wire-like transmission members 22, it is preferable that the band 54 be directly fixed to the base material 30 at positions except for the direct fixation positions. When a part of the band 54 is joined to the base material 30, the fixing member 50 can be directly fixed to the base material 30. With this, the fixing member 50 is less liable to rotate around the flat wiring member 20 in the state of being attached to the flat wiring member 20. In this case, if the annular part 54 is the band 54, which is formed capable of being entirely bent and deformed, the band can be easily directly fixed to a flat base material.

A part of the band 54 need not be joined to the base material 30. In this case, the band fixing part 56 may be located at the position to face the base material 30. In this case, it is considered that the direction in which the band 54 penetrates the band fixing part 56 is the direction along the main surface 32 of the base material 30. Further, it is considered that the inner surface of the band 54 comes in contact with the plurality of wire-like transmission members 22.

Fourth Embodiment

Figure 6:
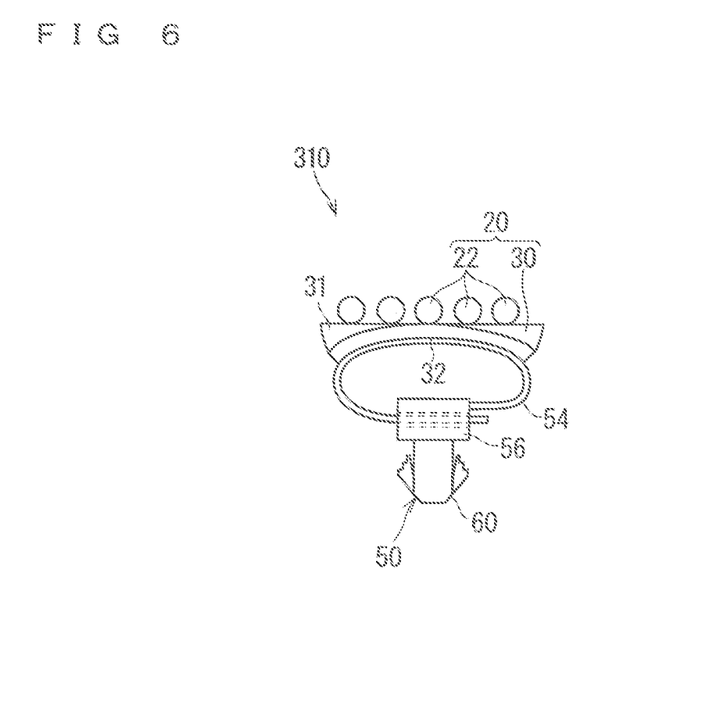
FIG. 6 is a front view illustrating a wiring member with a fixing member according to the fourth embodiment.

A wiring member with a fixing member according to the fourth embodiment will be described. FIG. 6 is a front view illustrating a wiring member with a fixing member 310 according to the fourth embodiment.

In the present example, the main surface 32 out of the base material 30 is joined to an outer circumferential portion of the band 54. Thus, in the present example, the band 54 being in the annular state can be in a state of not surrounding the wire-like transmission members 22 and the base material 30. When the main surface 32 out of the base material 30 is joined to the outer circumferential portion of the band 54, the flat wiring member 20 is located outside of the band 54, making it easy to maintain its spread state.

When the wiring member with a fixing member 310 is formed, similarly to the example illustrated in FIG. 5, it is preferable that the intermediate portion of the band 54 be joined to the base material 30. Note that the direction of the fixing part 60 is opposite to the direction illustrated in FIG. 5. The joining mode between the band 54 and the base material 30 is not particularly limited, and may be, for example, the direct fixation, the indirect fixation, or the like described above. When the band 54 and the base material 30 are directly fixed and the direct fixation positions between the wire-like transmission members 22 and the base material 30 are intermittently provided along the extending direction of the wire-like transmission members 22, it is preferable that the band 54 be directly fixed to the base material 30 at positions except for the direct fixation positions.

Fifth Embodiment

Figure 7:
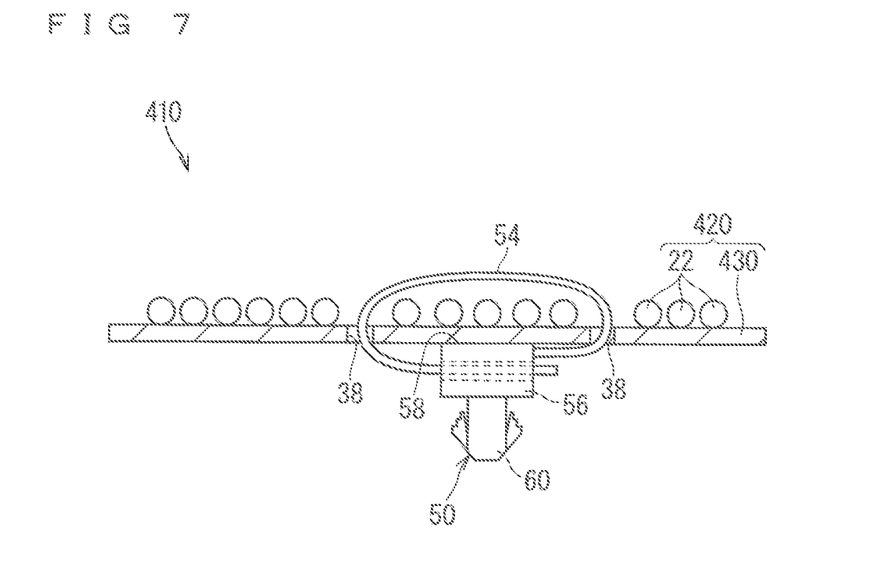
FIG. 7 is a front view illustrating a wiring member with a fixing member according to the fifth embodiment.

A wiring member with a fixing member according to the fifth embodiment will be described. FIG. 7 is a front view illustrating a wiring member with a fixing member 410 according to the fifth embodiment.

In the present example, the annular part 54 surrounds both of a base material 430 and the wire-like transmission members 22, and surrounds a flat wiring member 420 only partially in the width direction. In other words, at least one of the base material 430 and the wire-like transmission members 22 has a part not surrounded by the annular part 54. In the example illustrated in FIG. 7, the annular part 54 surrounds a part of the base material 430 and a part of the wire-like transmission members 22. Both of the base material 430 and the wire-like transmission members 22 have a part not surrounded by the annular part 54. In this case, a through hole 38 is formed in the base material 430. The through hole 38 is formed at the position of the base material 430 not to overlap the wire-like transmission members 22. The annular part 54 is in the annular state while penetrating the through hole 38.

In the example illustrated in FIG. 7, the annular part 54 surrounds an intermediate portion of the base material 430 in the width direction. Two through holes 38 are formed in the base material 430. The annular part 54 is in the annular state while penetrating the two through holes 38. The directions in which the annular part 54 penetrates the two through holes 38 are opposite to each other. In other words, the annular part 54 penetrates one through hole 38 from the main surface 31 side, and penetrates the other through hole 38 from the main surface 32 side. The annular part 54 may surround the end portion of the base material 430 in the width direction. In this case, it is only necessary that the annular part 54 penetrate one of the through holes 38 formed in the base material 430.

In the example illustrated in FIG. 7, the annular part 54 surrounds the wire-like transmission members 22 that are arrayed in the intermediate part out of the plurality of wire-like transmission members 22. The annular part 54 may surround the wire-like transmission members 22 that are arrayed at the end out of the plurality of wire-like transmission members 22.

The mode in which the annular part 54 surrounds both of the base material 430 and the wire-like transmission members 22 and surrounds the flat wiring member 421) only partially in the width direction is, for example, effective when the width dimension of the flat wiring member 420 is large.

FIG. 7 illustrates an example in which the fixing member 50 is the band clamp 50. The band fixing part 56 is located at the position to face the base material 430. The direction in which the band 54 penetrates the band fixing part 56 is the direction along the main surface 32 of the base material 430. A surface of the body part 57 of the band fixing part 56 on the opposite side of the surface in which the fixing part 60 is provided to project constitutes a plane surface part 58, and comes in surface contact with the main surface 32 of the base material 430. In this manner, if at least a part of the part surrounded by the annular part 54 in the flat wiring member 420 is spread along the plane surface part 58 provided in the fixing member 50 and comes in contact with the plane surface part 58, a part of the flat wiring member 420 coming in surface contact with the plane surface part 58 can be easily maintained in the flat state.

Sixth Embodiment

Figure 8:
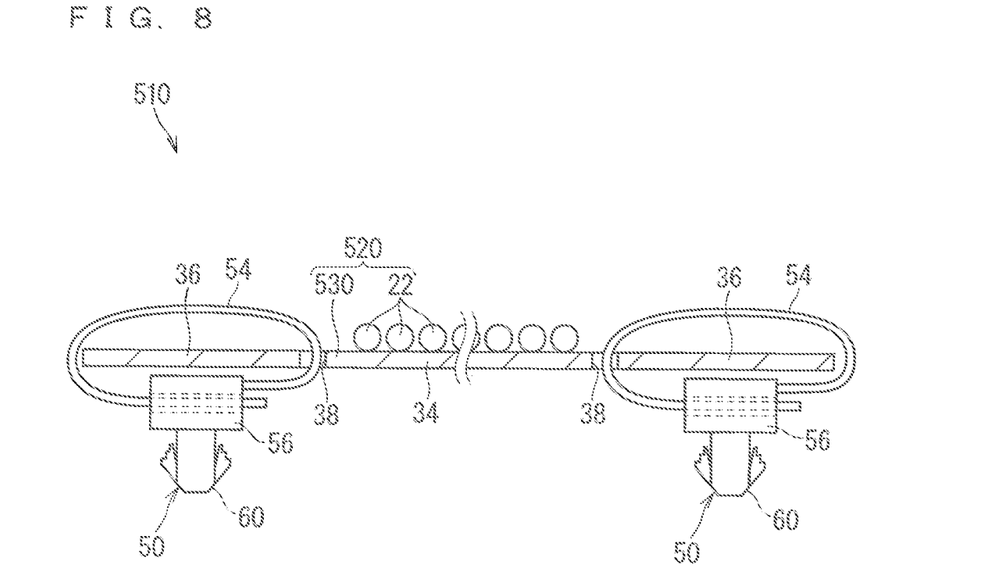
FIG. 8 is a front view illustrating a wiring member with a fixing member according to the sixth embodiment.

A wiring member with a fixing member according to the sixth embodiment will be described. FIG. 8 is a front view illustrating a wiring member with a fixing member 510 according to the sixth embodiment.

In the present example, the fixing member 50 is provided on each side of both the end portions of a base material 530 in the width direction. The annular part 54 surrounds only the base material 530 among the base material 530 and the wire-like transmission members 22. Specifically, the base material 530 includes a body part 34 and an extension piece 36. To the body part 34, the wire-like transmission members 22 are fixed. The extension piece 36 extends from the body part 34 toward the side. On the extension piece 36, the wire-like transmission members 22 are not disposed. The annular part 54 surrounds only the extension piece 36 among the body part 34 and the extension piece 36. In the extension piece 36, the through hole 38 is formed. The annular part 54 penetrates the through hole 38.

Seventh Embodiment

Figure 9:
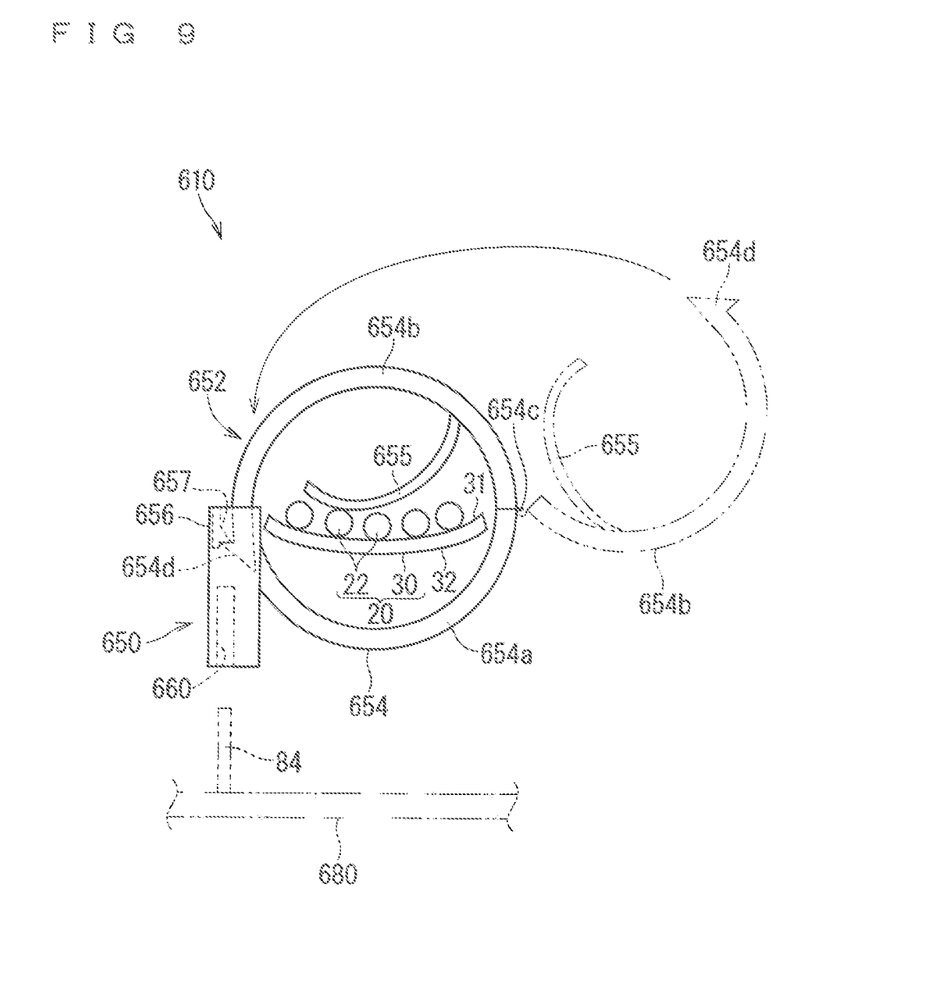
FIG. 9 is a front view illustrating a wiring member with a fixing member according to the seventh embodiment.

A wiring member with a fixing member according to the seventh embodiment will be described. FIG. 9 is a front view illustrating a wiring member with a fixing member 610 according to the seventh embodiment.

In the present example, the shape of a fixing member 650 is different from the fixing member 50. The fixing member 650 is a molded item obtained by integrally molding an attachment part 652 and a fixing part 660. The attachment part 652 includes an annular part 654 and an annular shape maintaining part 656. The annular part 654 can change its state between an annular state and a non-annular state. The annular part 654 surrounds the flat wiring member 20 in the annular state. The annular shape maintaining part 656 is provided at one end portion of the annular part 654. The annular shape maintaining part fastens another end portion of the annular part 654 and maintains the annular part 654 in the annular state. The present example is an example in which a hinge pivotable clamp 650 (also referred to as a corrugated clamp or the like) is used as the fixing member 650.

In the clamp 650, the annular part 654 includes a plurality (here, two) partial annular parts 654a and 654b, and a hinge part 654c. The partial annular parts 654a and 654b are each formed into a curved plate-like shape. The partial annular parts 654a and 654b have a shape that is divided in the circumferential direction. The plurality of partial annular parts 654a and 654b form an annular shape when being combined together. Each of the partial annular parts 654a and 654b has such rigidity as to be capable of maintaining a partially annular state. The hinge part 654c couples the partial annular parts 654a and 654b being adjacent to each other. For example, the hinge part 654c is a part that is formed to be thin.

In the clamp, a pressing piece 655 is provided. The pressing piece 655 protrudes from the inner surface of the partial annular part 654b toward the inner side of the annular part 654. One end portion of the pressing piece 655 is connected to the inner surface of the partial annular part 654b. Another end portion of the pressing piece 655 is a free end. For example, the pressing piece 655 can be elastically deformed about the one end portion, and can press the flat wiring member 20 that is surrounded by the annular part 654.

The annular shape maintaining part 656 is provided at the circumferential end portion of the partial annular part 654a. In the annular shape maintaining part 656, an engaging protrusion 657 is formed. The engaging protrusion 657 can be engaged with an engaged part 654d that is formed at the circumferential end portion of the partial annular part 654b.

The fixing part 660 is formed so as to allow insertion and engagement of a plate-like fixing piece 84 that is provided at a fixing target 680. The fixing part 660 is integral with the annular shape maintaining part 656. Specifically, a box part is provided at the circumferential end portion of the partial annular part 654a, and the engaging protrusion 657 is formed at one end of the box part and the fixing part 660 is provided at another end of the box part.

In the example illustrated in FIG. 9, the annular part 654 surrounds both of the base material 30 and the plurality of wire-like transmission members 22 similarly to the example illustrated in the third embodiment. However, this configuration is not an essential configuration. A region of the flat wiring member surrounded by the annular part 654 can be set as appropriate, and may be, for example, a region illustrated in other embodiments.

Eighth Embodiment

Figure 10:
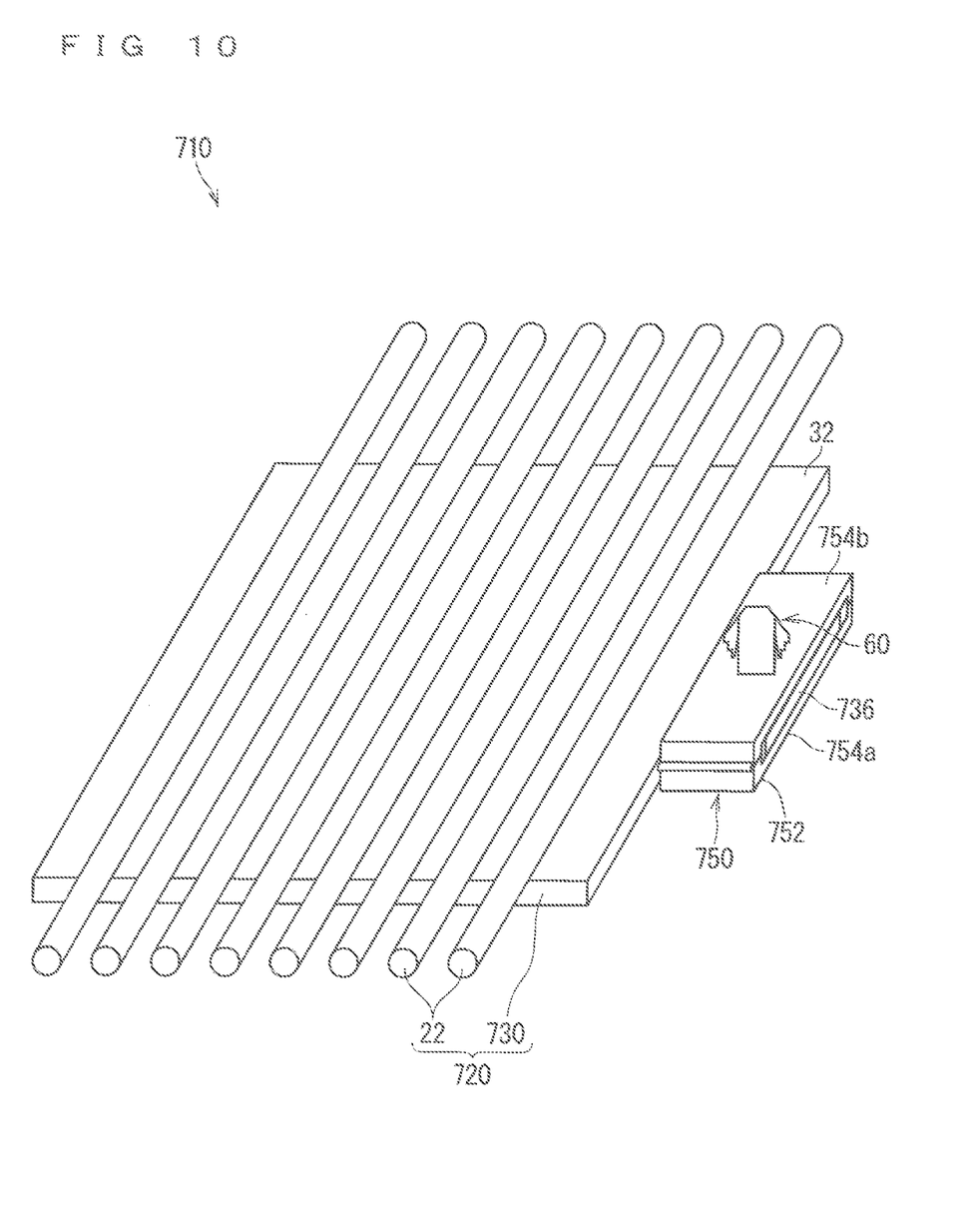
FIG. 10 is a perspective view illustrating a wiring member with a fixing member according to the eighth embodiment.
Figure 11:
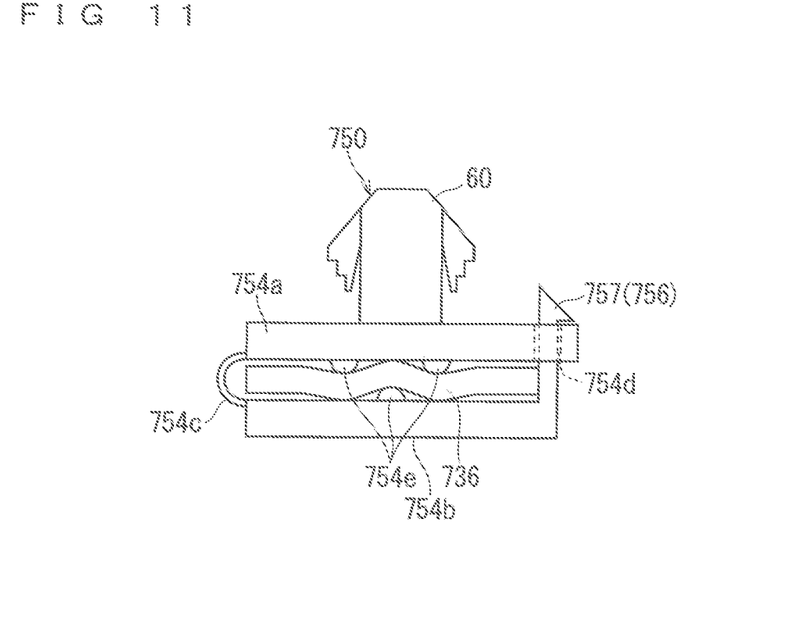
FIG. 11 is a side view illustrating a wiring member with a fixing member according to the eighth embodiment.

A wiring member with a fixing member according to the eighth embodiment will be described. FIG. 10 is a perspective view illustrating a wiring member with a fixing member 710 according to the eighth embodiment. FIG. 11 is a front view illustrating the wiring member with a fixing member 710 according to the eighth embodiment.

The present example is an example in which a fixing member 750 is a hinge pivotable clamp 750 similarly to the seventh embodiment. In the present example, partial annular parts 754a and 754b in an annular part 754 are formed into a flat plate-like shape. The partial annular parts 754a and 754b are connected with a hinge part 754c. An engaging protrusion 757 as an annular shape maintaining part 756 is provided at the end portion of the partial annular part 754b in the longitudinal direction. An engaged part 754d is formed at the end portion of the partial annular part 754a in the longitudinal direction. The engaged part 754d is formed into a through hole-like shape. When the engaging protrusion 757 penetrates and is engaged with the through hole-like engaged part 754d, the annular part 754 is in the annular state.

In the present example, a base material 730 includes a body part 34 and an extension piece 736. To the body part 34, the wire-like transmission members 22 are fixed. The extension piece 736 extends from the body part 34 toward the side. On the extension piece 736, the wire-like transmission members 22 are not disposed. The extension piece 736 is formed to have nearly the same width dimension as the partial annular parts 754a and 754b.

The annular part 754 surrounds only the extension piece 736 among the body part 34 and the extension piece 736. In the present example, with the annular part 754 sandwiching the extension piece 736, the attachment part 752 is in a state of being attached to a flat wiring member 720. In this case, a protrusion 754e is formed on the inner surface of the partial annular parts 754a and 754b. With this, the annular part 754 can securely sandwich the extension piece 736.

In the clamp 750, the fixing part 60 is provided as the fixing part. The fixing part 60 is provided to project on the outer surface of the partial annular part 754a. A fixing part other than the fixing part 60 may be provided in the clamp 750.

Ninth Embodiment

Figure 12:
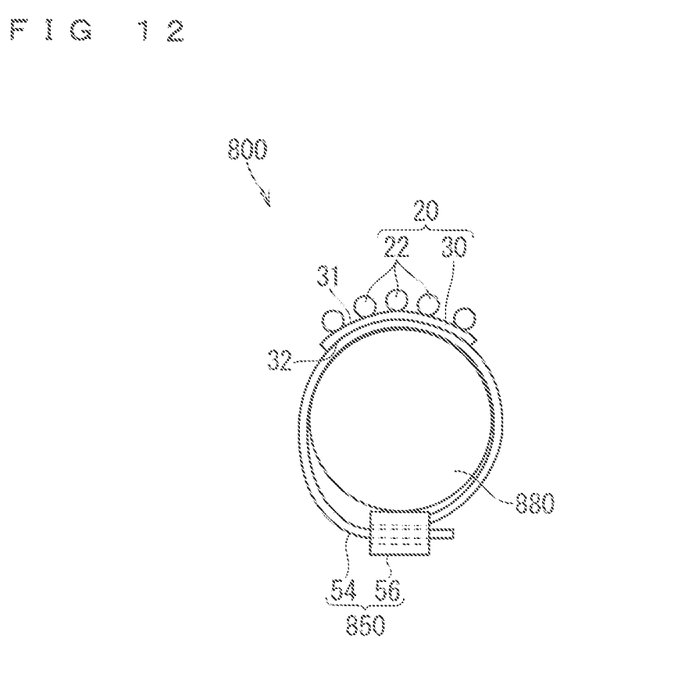
FIG. 12 is a front view illustrating a fixing structure of the wiring member according to the ninth embodiment.

A fixing structure of the wiring member according to the ninth embodiment will be described. FIG. 12 is a front view illustrating a fixing structure 800 of the wiring member according to the ninth embodiment.

The fixing structure 800 of the wiring member includes the flat wiring member 20, a fixing target 880, and a fixing member 850. The fixing target 880 is a fixing target of the flat wiring member 20. The fixing target 880 is, for example, a rod-like member 880 such as reinforcement. Although in the example illustrated in FIG. 12, cross-section of the rod-like member 880 has a circular shape, the cross-section may have a rectangular shape or the like. Alternatively, the rod-like member 880 may have a pillar shape (solid), or may have a tubular shape (hollow).

The fixing member 850 includes the annular part 54 and the annular shape maintaining part 56. As the fixing member 850, for example, a member obtained by omitting the fixing part 60 from the fixing member 50 can be used. As the fixing member 850, for example, a bundling band 850 can be adopted. The bundling band 850 includes the band 54 as the annular part 54, and the band fixing part 56 as the annular shape maintaining part 56.

A part of the annular part 54 is joined to the base material 30. The annular part 54 can change its state between an annular state and a non-annular state. In the annular state, the annular part 54 surrounds only the fixing target 880 among the fixing target 880 and the flat wiring member 20. The annular shape maintaining part 56 is provided at one end portion of the annular part 54, fastens another end portion of the annular part 54, and maintains the annular part 54 in the annular state.

Here, the intermediate portion of the band 54 and the base material 30 are joined together. The joining mode between the band 54 and the base material 30 is not particularly limited, and may be, for example, the direct fixation, the indirect fixation, or the like described above. When the band 54 and the base material 30 are directly fixed and the direct fixation positions between the wire-like transmission members 22 and the base material 30 are intermittently provided along the extending direction of the wire-like transmission members 22, it is preferable that the band 54 be directly fixed to the base material 30 at positions except for the direct fixation positions.

According to the fixing structure 800 of the wiring member, the annular part 54 is partially fixed to the base material 30, and surrounds only the fixing target 880 among the fixing target 880 and the flat wiring member 20 in the annular state, and thus the flat wiring member 20 can maintain the spread state to the extent possible in a state of being fixed to the fixing target 80 by the fixing member 850 including the annular part 54.

Tenth Embodiment

Figure 13:
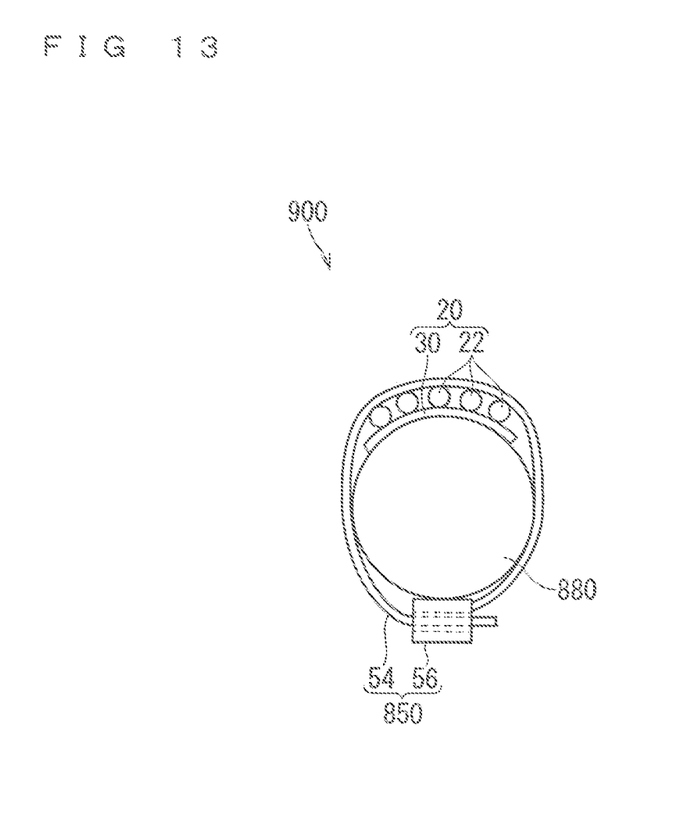
FIG. 13 is a front view illustrating a fixing structure of the wiring member according to the tenth embodiment.

A fixing structure of the wiring member according to the tenth embodiment will be described. FIG. 13 is a front view illustrating a fixing structure 900 of the wiring member according to the tenth embodiment.

The fixing structure 900 of the wiring member is different from the fixing structure 800 of the wiring member in that the annular part 54 in the annular state surrounds the fixing target 880 and the flat wiring member 20, and presses the flat wiring member 20 toward the fixing target 880. In this case, in the example illustrated in FIG. 13, the annular part 54 surrounds both of the base material 30 and the wire-like transmission members 22 in the flat wiring member 20. However, this configuration is not an essential configuration. Similarly to the above, the annular part 54 may surround only the base material 30, or may surround only the wire-like transmission members 22, among the base material 30 and the wire-like transmission members 22. Further, in the example illustrated in FIG. 13, the base material 30 among the base material 30 and the wire-like transmission members 22 faces the fixing target 880. However, the wire-like transmission members 22 among the base material 30 and the wire-like transmission members 22 may face the fixing target 880.

The annular part 54 in the annular state surrounds the fixing target 880 and the flat wiring member 20, and presses the flat wiring member 20 toward the fixing target 80, and thus the flat wiring member 20 can maintain the spread state to the extent possible in state of being fixed to the fixing target 880 by the fixing member 850 including the annular part 54.

When the annular part 54 surrounds the fixing target 880 and the flat wiring member 20 in the annular state as in the present example, the annular part 54 and the base material 30 need not be joined together.

Note that each configuration described in each embodiment and each modification described above can be combined with each other as appropriate unless there is no inconsistency.

EXPLANATION OF REFERENCE SIGNS 10, 110, 210, 310, 410, 510, 610, 710 Wiring member with fixing member
20, 420, 520, 720 Flat wiring member
22 Wire-like transmission member
30, 430, 530, 730 Base material
31, 32 Main surface
34 Body part
36, 736 Extension piece
38 Through hole
50, 650, 750, 850 Fixing member 52 Attachment part
54, 654, 754 Annular part
654a, 654b, 754a, 754b Partial annular part
654c, 754c Hinge part
654d, 754d Engaged part
755e Protrusion
56, 656 Annular shape maintaining part
57 Body part
57h Band insertion hole
657 Engaging protrusion
58 Plane surface part
60, 660 Fixing part
61 Pillar part
62 Engagement piece
80, 680, 880 Fixing target
82 Fixing hole
84 Fixing piece
800, 900 Fixing structure of wiring member
A Direct fixation position

The invention claimed is:

1. A wiring member with a fixing member, comprising:
a flat wiring member; and
the fixing member, wherein
the flat wiring member includes a plurality of wire-like transmission members and a base material,
the plurality of wire-like transmission members are fixed to the base material in an arrayed state,
the fixing member includes an attachment part and a fixing part,
the attachment part includes an annular part and an annular shape maintaining part,
the annular part is capable of changing a state between an annular state and a non-annular state,
the annular shape maintaining part is provided at one end portion of the annular part, fastens another end portion of the annular part, and maintains the annular part in the annular state,
the fixing part is a part being connected to the attachment part and being fixed to a fixing target of the flat wiring member,
in a state in which the annular part is in the annular state and the attachment part is attached to the flat wiring member, a part of the flat wiring member to which the attachment part is attached is in a spread state, and
the annular part surrounds both of the base material and the plurality of wire-like transmission members, and surrounds the flat wiring member entirely in a width direction.

2. The wiring member with the fixing member according to claim 1, wherein
the annular part is a band capable of being entirely bent and deformed, and
in the annular state in which the band surrounds at least a part of the flat wiring member, the attachment part is attached to the flat wiring member.

3. The wiring member with the fixing member according to claim 1, wherein
the annular part is a band being formed to be capable of being entirely bent and deformed and partially joined to the base material.

4. The wiring member with the fixing member according to claim 3, wherein
a main surface of the base material on an opposite side of a main surface to which the plurality of wire-like transmission members are fixed is joined to an outer circumferential portion of the band.

5. A wiring member with a fixing member, comprising:
a flat wiring member; and
the fixing member, wherein
the flat wiring member includes a plurality of wire-like transmission members and a base material,
the plurality of wire-like transmission members are fixed to the base material in an arrayed state,
the fixing member includes an attachment part and a fixing part,
the attachment part includes an annular part and an annular shape maintaining part,
the annular part is capable of changing a state between an annular state and a non-annular state,
the annular shape maintaining part is provided at one end portion of the annular part, fastens another end portion of the annular part, and maintains the annular part in the annular state,
the fixing part is a part being connected to the attachment part and being fixed to a fixing target of the flat wiring member,
in a state in which the annular part is in the annular state and the attachment part is attached to the flat wiring member, a part of the flat wiring member to which the attachment part is attached is in a spread state,
the annular part is a band being formed to be capable of being entirely bent and deformed and partially joined to the base material,
a main surface of the base material on an opposite side of the main surface to which the plurality of wire-like transmission members are fixed is joined to an outer circumferential portion of the band, and
at least a part of a part surrounded by the annular part in the flat wiring member is spread along a plane surface part provided in the fixing member and comes in contact with the plane surface part.

6. The wiring member with the fixing member according to claim 5, wherein
the annular part surrounds both of the base material and the plurality of wire-like transmission members, and surrounds the flat wiring member only partially in a width direction.

7. The wiring member with the fixing member according to claim 5, wherein
the annular part is inserted between the base material and the plurality of wire-like transmission members, and surrounds only the base material among the base material and the plurality of wire-like transmission members.

8. The wiring member with the fixing member according to claim 5, wherein
the annular part is inserted between the base material and the plurality of wire-like transmission members, and surrounds only the plurality of wire-like transmission members among the base material and the plurality of wire-like transmission members.

* * * * *